United States Patent
Exner

(10) Patent No.: US 9,835,090 B2
(45) Date of Patent: Dec. 5, 2017

(54) FIRE SEAL FOR A GAS TURBINE ENGINE

(71) Applicant: United Technologies Corporation, Hartford, CT (US)

(72) Inventor: Matthew Exner, East Hampton, CT (US)

(73) Assignee: United Technologies Corporation, Farmington, CT (US)

( * ) Notice: Subject to any disclaimer, the term of this patent is extended or adjusted under 35 U.S.C. 154(b) by 907 days.

(21) Appl. No.: 13/621,986

(22) Filed: Sep. 18, 2012

(65) Prior Publication Data

US 2014/0075948 A1 Mar. 20, 2014

(51) Int. Cl.
  *F02C 7/25* (2006.01)
  *F02C 7/28* (2006.01)

(52) U.S. Cl.
  CPC . *F02C 7/25* (2013.01); *F02C 7/28* (2013.01)

(58) Field of Classification Search
  CPC .... F02C 7/28; F02C 7/25; F01D 9/023; F01D 11/00; F16J 15/065; F23R 2900/00012
  USPC ........... 60/39.01, 39.11, 796, 797; 415/214.1
  See application file for complete search history.

(56) References Cited

U.S. PATENT DOCUMENTS

| | | | |
|---|---|---|---|
| 3,928,906 A * | 12/1975 | Good et al. | 29/460 |
| 5,458,343 A | 10/1995 | Dornfeld et al. | |
| 5,524,846 A * | 6/1996 | Shine et al. | 244/53 R |
| 5,910,094 A | 6/1999 | Kraft et al. | |
| 5,915,697 A * | 6/1999 | Bagepalli et al. | 277/627 |
| 6,502,825 B2 * | 1/2003 | Aksit et al. | 277/355 |
| 7,828,298 B2 | 11/2010 | Cummings | |
| 8,087,674 B2 | 1/2012 | Cummings | |
| 2008/0053107 A1 | 3/2008 | Weaver et al. | |
| 2010/0095650 A1 * | 4/2010 | Schafer | 60/226.3 |
| 2011/0018213 A1 | 1/2011 | Bunel | |
| 2011/0203251 A1 * | 8/2011 | Mayes et al. | 60/39.091 |

FOREIGN PATENT DOCUMENTS

| | | |
|---|---|---|
| EP | 1323895 | 7/2003 |
| JP | 06096992 | 11/1994 |
| KR | 1019990029269 | 4/1999 |

OTHER PUBLICATIONS

International Search Report and Written Opinion for International Application No. PCT/US2013/058658 completed Nov. 27, 2013.
International Preliminary Report on Patentability for International Application No. PCT/US2013/058658dated Apr. 2, 2015.

\* cited by examiner

*Primary Examiner* — Ehud Gartenberg
*Assistant Examiner* — Jason H Duger
(74) *Attorney, Agent, or Firm* — Carlson, Gaksey & Olds. P.C.

(57) ABSTRACT

A fire seal includes a molded body having a base portion, a curved portion extending from the base portion, and a metal seal support surrounding the base portion and a radially inward surface of the curved portion. The curved portion has a partially circular cross section.

21 Claims, 3 Drawing Sheets

FIRE SEAL FOR A GAS TURBINE ENGINE

TECHNICAL FIELD

The present disclosure is related generally to fire seals, and more specifically to fire seals for use in a turbine engine.

BACKGROUND OF THE INVENTION

Turbine engines, such as those used on commercial aircraft, often utilize multiple engine components that are connected together. Within the turbine engines, it is desirable to seal gaps between two components of the turbine engine in order to prevent an engine fire from spreading to another part of the turbine engine, should an engine fire occur. This seal is accomplished using an engine firewall and a fire seal.

A typical firewall and fire seal arrangement seals a gap between two parts of a turbine engine and maintains a fireproof seal and an air pressure seal between the two parts for all operating conditions (including during an engine fire.) This fireproof capability is validated during fire tests that expose the seal to upwards of 2000 F for a predetermined period of time.

Existing fire seal designs utilize a tubular body constructed of silicone, or a similar material, connected to a base. At high temperatures the body produces volatile gasses in a process referred to as "outgassing". In order to reduce the chances of a fire spreading from an engine side of the fire seal to the opposite side of the fire seal as a result of the outgassed gasses, the amount of volatile gasses outgassed to the opposite side is minimized.

SUMMARY OF THE INVENTION

A turbine engine according to an exemplary embodiment of this disclosure, among other possible things includes a compressor section, a combustor in fluid communication with the compressor section, a turbine section in fluid communication with the combustor, a gas bypass flowpath and a primary gas flowpath, the gas bypass flowpath bypasses the compressor section, the combustor section, and the turbine section and the primary gas flowpath passes through each of the compressor section, the combustor and the turbine section, and at least one fire seal separating one of the compressor section, the combustor, and the turbine section from the gas bypass flowpath, the at least one fire seal comprises, a molded body having a base portion, a semi-tubular curved portion extending from the base portion, the curved portion has a partially generally circular cross section, and a metal seal support surrounding the base portion and a radially inward surface of the curved portion.

A further embodiment of the foregoing turbine engine, further includes a mesh fabric liner supporting a radially outward surface of the curved portion.

In a further embodiment of the foregoing turbine engine, the mesh fabric liner is a surface durability enhancer.

In a further embodiment of the foregoing turbine engine, the molded body is a silicone body.

In a further embodiment of the foregoing turbine engine, curved portion includes a flexing region and the fire seal further includes a gap radially across from the curved section.

In a further embodiment of the foregoing turbine engine, the flexing region is flexed when the fire seal is sealed and the flexing region is relaxed when the fire seal is unsealed.

In a further embodiment of the foregoing turbine engine, a length of the gap is decreased when the fire seal is in a compressed state relative to a length of the gap when the fire seal is in a relaxed state.

In a further embodiment of the foregoing turbine engine, the gap is a space between an end of the curved section and the base portion of the fire seal.

In a further embodiment of the foregoing turbine engine, the metal seal is an outgas barrier operable to prevent outgassing from the molded body.

In a further embodiment of the foregoing turbine engine, the metal seal support is a flexible metal material.

In a further embodiment of the foregoing turbine engine, the metal seal support is stainless steel.

A fire seal according to an exemplary embodiment of this disclosure, among other possible things includes a molded body having a base portion, a curved portion extending from the base portion, the curved portion has a partially circular cross section, and a metal seal support surrounding the base portion and a radially inward surface of the curved portion.

A further embodiment of the foregoing fire seal, further includes a mesh fabric liner supporting a radially outward surface of the curved portion.

In a further embodiment of the foregoing fire seal, the mesh fabric liner is a surface durability enhancer.

In a further embodiment of the foregoing fire seal, the molded body is a silicone body.

In a further embodiment of the foregoing fire seal, the curved portion comprises a flexing region and the fire seal further comprises a gap radially across from the curved section.

In a further embodiment of the foregoing fire seal, the flexing region is flexed when the fire seal is sealed and the flexing region is relaxed when the fire seal is unsealed.

In a further embodiment of the foregoing fire seal, a length of the gap is decreased when the fire seal is in a compressed state relative to a length of the gap when the fire seal is in a relaxed state.

In a further embodiment of the foregoing fire seal, the gap is a space between an end of the curved section and the base portion of the fire seal.

In a further embodiment of the foregoing fire seal, the metal seal is an outgas barrier operable to prevent outgassing from the molded body.

In a further embodiment of the foregoing fire seal, the metal seal support is a flexible metal material.

In a further embodiment of the foregoing fire seal, the metal seal support is stainless steel.

These and other features of the present invention can be best understood from the following specification and drawings, the following of which is a brief description.

DETAILED DESCRIPTION

Figure 1:
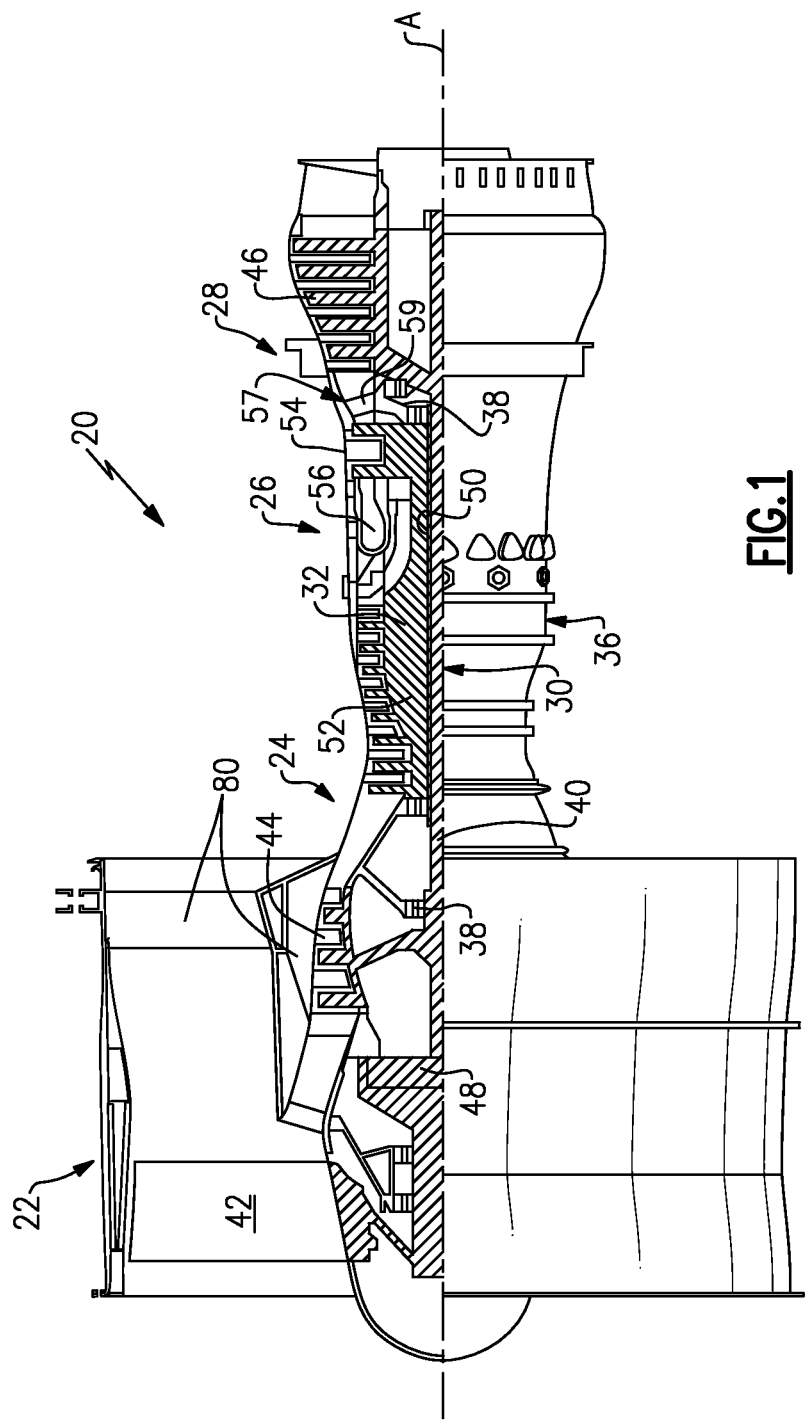
FIG. 1 schematically illustrates an example gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flowpath 80 while the compressor section 24 drives air along a core flowpath for compression and communication into the combustor section 26 then expansion through the turbine section 28. Although depicted as a turbofan gas turbine engine in the disclosed non-limiting embodiment, it should be understood that the concepts described herein are not limited to use with turbofans as the teachings may be applied to other types of turbine engines including three-spool architectures.

The engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided.

The low speed spool 30 generally includes an inner shaft 40 that interconnects a fan 42, a low pressure compressor 44 and a low pressure turbine 46. The inner shaft 40 is connected to the fan 42 through a geared architecture 48 to drive the fan 42 at a lower speed than the low speed spool 30. The high speed spool 32 includes an outer shaft 50 that interconnects a high pressure compressor 52 and high pressure turbine 54. A combustor 56 is arranged between the high pressure compressor 52 and the high pressure turbine 54. A mid-turbine frame 57 of the engine static structure 36 is arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path. The turbines 46, 54 rotationally drive the respective low speed spool 30 and high speed spool 32 in response to the expansion.

The engine 20 in one example is a high-bypass geared aircraft engine. In a further example, the engine 20 bypass ratio is greater than about six (6), with an example embodiment being greater than ten (10), the geared architecture 48 is an epicyclic gear train, such as a planetary gear system or other gear system, with a gear reduction ratio of greater than about 2.3 and the low pressure turbine 46 has a pressure ratio that is greater than about 5. In one disclosed embodiment, the engine 20 bypass ratio is greater than about ten (10:1), the fan diameter is significantly larger than that of the low pressure compressor 44, and the low pressure turbine 46 has a pressure ratio that is greater than about 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.5:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet. The flight condition of 0.8 Mach and 35,000 ft, with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of [(Tram ° R)/(518.7° R)] 0.5. The "Low corrected fan tip speed" as disclosed herein according to one non-limiting embodiment is less than about 1150 ft/second.

In the illustrated example of FIG. 1, there is a gap between the engine nacelle defining the bypass flow path 80 and the compressor section 24. During operation, the nacelle moves slightly in relation to the compressor section 24, since the nacelle is a composite of structures and is not attached directly to the compressor section 24 via fasteners. The nacelle structures include access ports that can be opened and closed in order to provide access to the engine during maintenance activity. The relative motion, and the lack of fasteners, results in a gap in the nacelle wall differentiating the compressor section 24 from the bypass flow path 80. A fire seal is attached to the nacelle side of the gap and is compressed between the nacelle wall and an engine firewall seal land when the access port is closed. The fire seal provides both a fire barrier and an air pressure barrier, thereby sealing the gap and preventing engine fires from spreading from the compressor section 24 to the bypass flow path 80.

Figure 2:
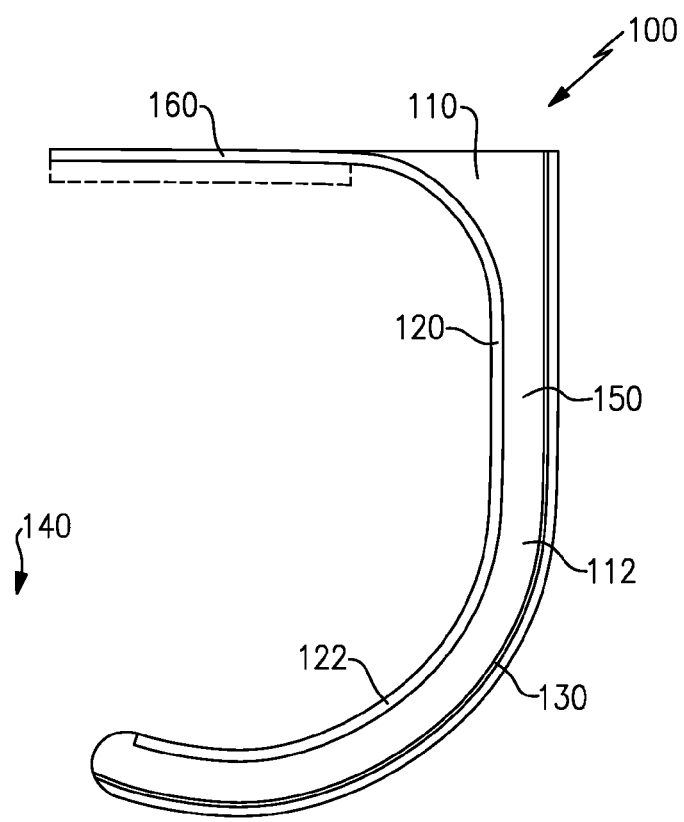
FIG. 2 schematically illustrates a cross sectional view of a fire seal for utilization in the gas turbine engine of FIG. 1.

FIG. 2 schematically illustrates a fire seal 100 that is utilized in the example turbine engine 20. The fire seal 100 includes a silicone body portion 110 that has a base 160 and a semi-tubular curved section 150 has a partially generally circular cross section that extends from the base 160. The base portion 160 and a radially inner side of the curved section 150 is covered by a metal seal support 120 that includes a base seal support section 160 and a curved seal support section 122. The curved section 122 of the metal seal support 120 lines an inner circumference of the curved section 150 of the silicone body 110. A radially outward side of the curved section 150 of the silicone body 110 includes a mesh fabric 130 liner that is a surface durability enhancer and increases the surface durability of the fire seal 100. The metal seal support 120 is bonded to the silicone body 110 of the seal 100 during the molding process and prevents out gassing from occurring at any surfaces covered by the metal seal support 120.

The fire seal 100 includes a gap portion 140 where the curved portion 150 of the silicone body 110 would connect to the base portion 160 if the curve of the curved section 150 continued. The fire seal 100 further includes a flexing region 112 opposite the gap portion 140. The combination of the gap portion 140 and the flexing region 112 allows the fire seal to fit tightly at a turbine engine gap and create an adequate seal when the fire seal 100 is compressed.

Figure 3:
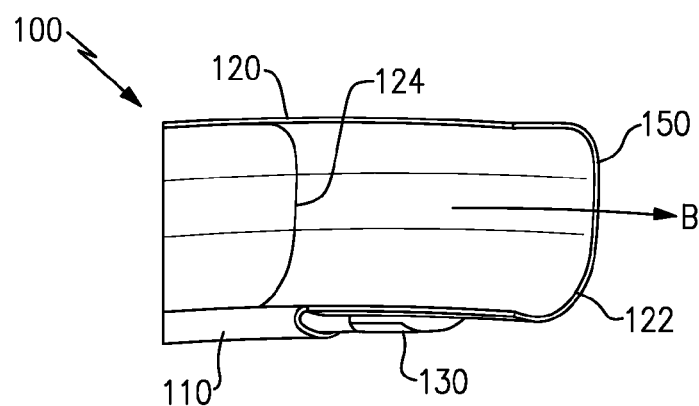
FIG. 3 schematically illustrates an isometric view of the example fire seal of FIG. 2.

The metal seal support 120 is made from any metal seal material, such as stainless steel. The metal seal support 120 is thin enough to allow the fire seal 100 to flex in the flexing region 112 when there is relative motion between the two components being sealed. The flexing allows the seal to be maintained during relative motion. The silicone body 110 may be molded onto the metal seal support 120 using standard molding processes. In some examples, such as the illustrated example, a mesh fabric material is included in the molding process to enhance surface durability on the radially outward side of the fire seal. The radially outward side of the fire seal 100 is not covered by the metal seal support 120. In order to facilitate the flexing of the metal seal support 120 at the curved section 122, the metal seal support is constructed of multiple segments broken along a radial line stemming from the engine centerline axis A (FIG. 1). By breaking the metal seal support 120 into multiple segments, the flexibility of the metal seal support 120 in the curved section 122 is improved as well as the flexibility of the overall seal 100. FIG. 3 schematically illustrates an isometric view of the fire seal 100 of FIG. 2. The curved section 122 of the metal seal support 120 and the curved section 150 of the silicone body 110 are semi-tubular and define an axis B. The axis B follows the circumference of the gas turbine engine core. As with the example of FIG. 2, the gap portion 140 is defined by the area that would incorporate the curved section 150 of the seal 100 if the curved section 150 extended to the base portion 160. The silicone body 110 and the mesh fabric 130 are illustrated as not fully extending to the end of the fire seal 100 for illustrative effect. In a typical implementation, the silicone body 110 and the mesh fabric 130 extend the full axial length of the fire seal 100. In another typical embodiment, the metal seal support 120 is segmented, as described above, and is broken at a segment break 124 that runs radially away from the engine centerline axis A.

Figure 4A:
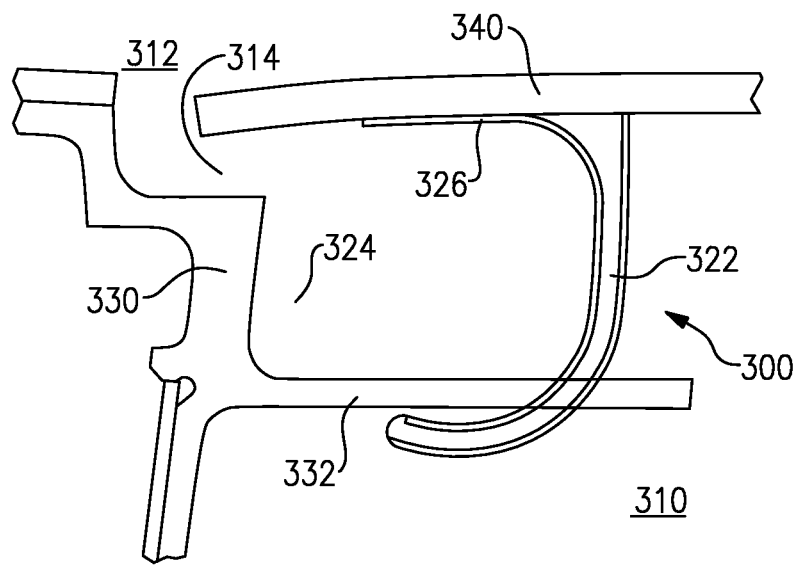
FIG. 4A schematically illustrates the fire seal of FIG. 2 in an installed position with the seal uncompressed.
Figure 4B:
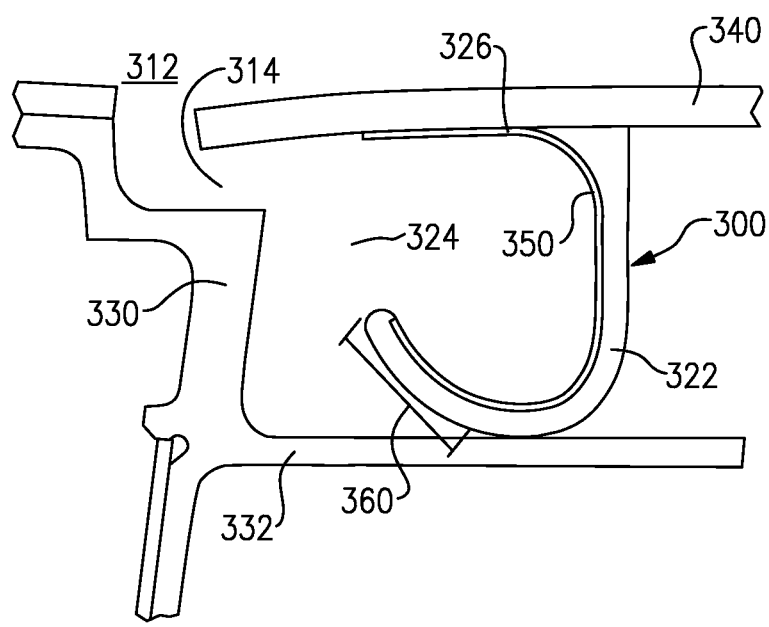
FIG. 4B illustrates the fire seal of FIG. 2 in an installed position with the seal compressed.

FIGS. 4A and 4B schematically illustrate a cross section of the fire seal 100 installed between a fan bypass duct 312 and a compressor section 310 of the turbine engine 20, illustrated in FIG. 1. The engine structure includes a firewall 330 that interacts with the fire seal to prevent fire from traveling from the compressor section 310 to the fan bypass duct 312 should an engine fire occur. Due to the relative motion between the outer nacelle wall 340 and the compressor section 310 during operation of the engine 20, a gap 314 between the outer nacelle wall 340 and the compressor section 310 exists. To seal the gap 314, a fire seal 320 is connected to an outer nacelle wall 340 of the compressor section 310. The fire seal 320 is connected to the outer nacelle wall at the fire seal base 326 via any method including, but not limited to, one or more fasteners through the fire seal base 326. A firewall seal land 332 extends axially (relative to the engine centerline axis A) from the firewall 330. The firewall seal land 332 interfaces with the curved portion 322 of the fire seal 300 and creates a seal that is operable to prevent engine fires within the compressor section 310 from exiting the gap 314 and entering the fan bypass duct 312.

FIG. 4A illustrates the fire seal 300 in an uncompressed (relaxed) position, without the influence of the firewall seal land 332. FIG. 4B illustrates the fire seal 300 in a flexed, or compressed, position due to the relative positions of the firewall seal land 332 and the outer nacelle wall 340. In the compressed fire seal 300 of FIG. 4B, the curved region of the fire seal 300 is flexed, and the length gap 324 in the fire seal 300 is decreased relative to the length of the gap 324 when the fire seal 300 is relaxed. It is understood that the gap is sealed when the fire seal 300 is compressed, and unsealed when the fire seal 300 is relaxed.

As described above, when the fire seal 300 is exposed to high temperatures, such as those present in the case of an engine fire, the silicone body outgasses volatile gasses that can combust. The volatile gasses are outgassed from the exposed surface of the fire seal. The presence of the metal sheet 350 covers the inner radial wall of the curved section, as well as covering the surface area of the base portion 326. The coverage over the seal significantly reduces the silicone surface area exposed to the duct side of the fire seal 100. As a result, the only portion of the seal that outgasses is the radially outward portion of the curved section 322. Only a minimal portion 360 of the curved section 322 of the fire seal 300 is exposed to the bypass duct side 324, thereby minimizing the amount of volatile gasses outgassed into the component gap 314 and reducing the possibility of fire spreading from the engine side of the seal to the bypass duct side of the seal.

While the above example describes a seal between a compressor section and a bypass duct, it is understood that the described seal can be utilized between any two turbine engine components and provide an adequate seal. Thus the listed components are exemplary only. Furthermore, while the above seal is described as a silicone seal, it is understood that another similar material could be utilized in place of silicone and fall within the auspices of this disclosure.

Although embodiments of this disclosure have been disclosed, a worker of ordinary skill in this art would recognize that certain modifications would come within the scope of the invention. For that reason, the following claims should be studied to determine the true scope and content of this invention.

The invention claimed is:

1. A turbine engine comprising:
   a compressor section;
   a combustor in fluid communication with the compressor section;
   a turbine section in fluid communication with the combustor;
   a gas bypass flowpath and a primary gas flowpath, wherein said gas bypass flowpath bypasses said combustor, said combustor section, and said turbine section and wherein said primary gas flowpath passes through each of said compressor section, said combustor and said turbine section; and
   at least one fire seal separating one of said compressor section, said combustor, and said turbine section from said gas bypass flowpath, wherein said at least one fire seal comprises:
      a molded body having a base portion;
      a curved portion extending from said base portion, wherein the curved portion has a first end and a second end opposite the first end, wherein the curved portion is connected to said base portion at the first end, wherein said curved portion has a partially circular cross section, and said curved portion is partially tubular;
      a gap defined by a distance between said second end of said curved portion and said base portion of said molded body; and
      a metal seal support surrounding said base portion and a radially inward surface of said curved portion.

2. The turbine engine of claim 1 further comprising a mesh fabric liner supporting a radially outward surface of said curved portion.

3. The turbine engine of claim 2, wherein said mesh fabric liner is a surface durability enhancer.

4. The turbine engine of claim 1, wherein said molded body is a silicone body.

5. The turbine engine of claim 1, wherein said curved portion comprises a flexing region.

6. The turbine engine of claim 5, wherein said flexing region is flexed when said fire seal is sealed and wherein said flexing region is relaxed when said fire seal is unsealed.

7. The turbine engine of claim 5, wherein a length of said gap is decreased when said fire seal is in a compressed state relative to the length of said gap when said fire seal is in a relaxed state.

8. The turbine engine of claim 1, wherein the base portion and the curved portion are a single structure.

9. The turbine engine of claim 1, wherein said metal seal support is an outgas barrier operable to prevent outgassing from said molded body.

10. The turbine engine of claim 1, wherein said metal seal support is a flexible metal material.

11. The turbine engine of claim 10, wherein said metal seal support is stainless steel.

12. A fire seal comprising:
a molded body having a base portion;
a curved portion extending from said base portion, wherein the curved portion has a first end and a second end opposite the first end, wherein the curved portion is connected to said base portion at the first end, wherein said curved portion has a partially circular cross section;
a gap defined by a distance between said second end of said curved portion and said base portion of said molded body; and
a metal seal support surrounding said base portion and a radially inward surface of said curved portion.

13. The fire seal of claim 12 further comprising a mesh fabric liner supporting a radially outward surface of said curved portion.

14. The fire seal of claim 13, wherein said mesh fabric liner is a surface durability enhancer.

15. The fire seal of claim 12, wherein said molded body is a silicone body.

16. The fire seal of claim 12, wherein said curved portion comprises a flexing region.

17. The fire seal of claim 16, wherein said flexing region is flexed when said fire seal is sealed and wherein said flexing region is relaxed when said fire seal is unsealed.

18. The fire seal of claim 16, wherein a length of said gap is decreased when said fire seal is in a compressed state relative to the length of said gap when said fire seal is in a relaxed state.

19. The fire seal of claim 12, wherein said metal seal support is an outgas barrier operable to prevent outgassing from said molded body.

20. The fire seal of claim 12, wherein said metal seal support is a flexible metal material.

21. The fire seal of claim 20, wherein said metal seal support is stainless steel.

\* \* \* \* \*